United States Patent [19]

Krahmer

[11] 4,099,414

[45] Jul. 11, 1978

[54] AUTOMATIC RELEASE HOSPITAL THERMOMETER

[76] Inventor: Jon L. Krahmer, 511 E. Second, Fairmont, Minn. 56031

[21] Appl. No.: 798,430

[22] Filed: May 19, 1977

[51] Int. Cl.² .......................... G01K 5/06; G01K 1/14
[52] U.S. Cl. ...................................... 73/373; 73/374; 206/306
[58] Field of Search ............. 73/371, 373, 374, 343 R; 206/306

[56] References Cited

U.S. PATENT DOCUMENTS

| 2,045,693 | 6/1936 | Broder | 73/373 |
| 2,413,959 | 1/1947 | Eisele | 73/371 |
| 2,652,726 | 9/1953 | Gotthart | 73/371 |
| 3,717,035 | 2/1973 | Klingler et al. | 73/371 |
| 3,950,994 | 4/1976 | Gart | 73/371 |

Primary Examiner—Charles Gorenstein
Attorney, Agent, or Firm—Merchant, Gould, Smith, Edell, Welter & Schmidt

[57] ABSTRACT

A new arrangement for facilitating the taking of temperatures both in hospitals and in the home by simplifying the resetting of a clinical thermometer to a lower, ambient temperature after use. A plunger in the reservoir of the thermometer is magnetically actuable into a position in which it disables a restriction at which the mercury column separates to retain a reading. Several forms of this plunger are shown, and also shown is a holder for use with the thermometer to actuate the plunger.

10 Claims, 9 Drawing Figures

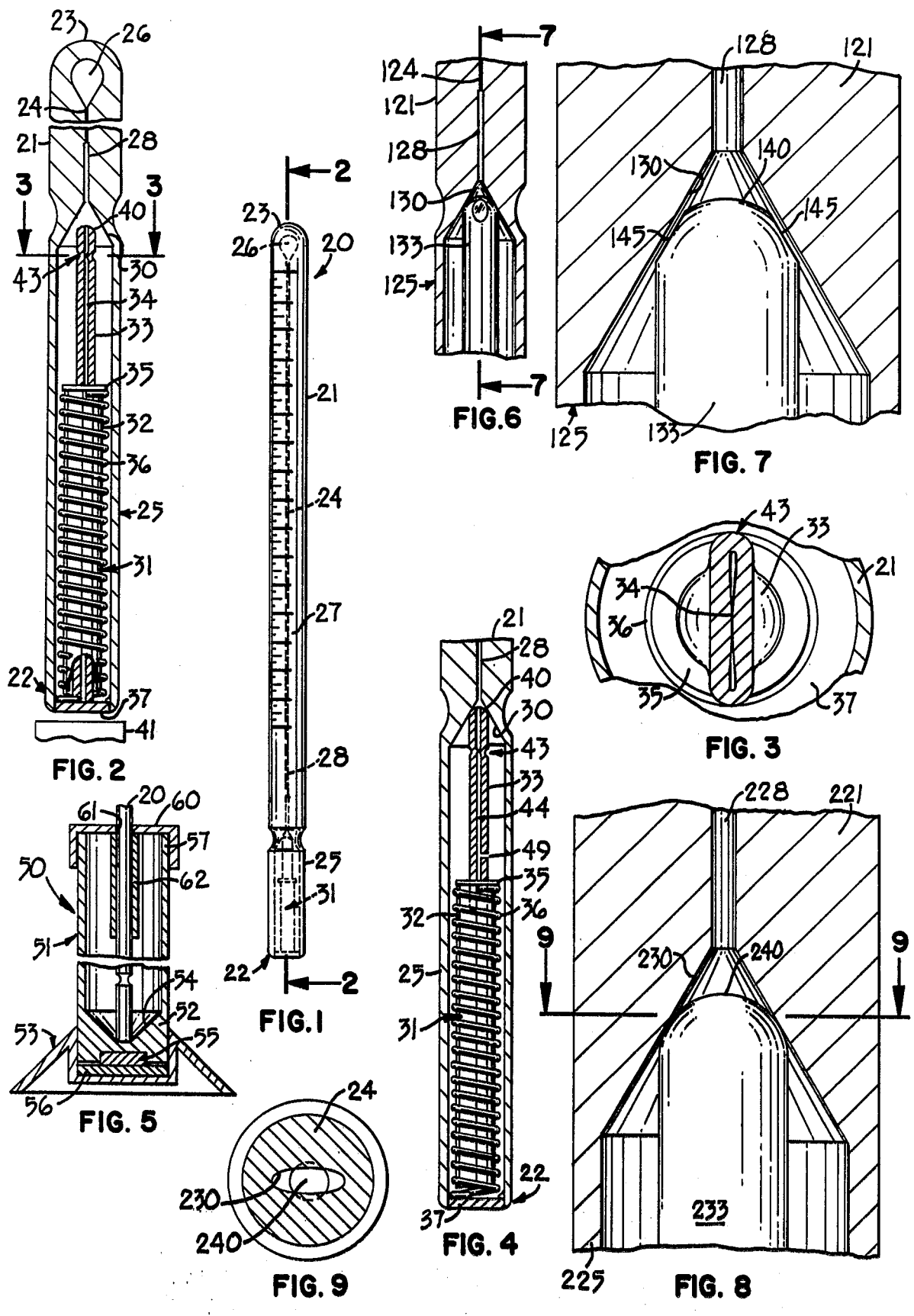

AUTOMATIC RELEASE HOSPITAL THERMOMETER

BACKGROUND OF THE INVENTION

This invention relates to the field of public health, and particularly to a new clinical thermometer arrangement in which the necessity to "shake down" the mercury after a reading has been taken is obviated.

As is well known, a clinical thermometer is a device designed for taking a patient's temperature by being inserted into a body cavity and allowed to come to a condition of thermal equilibrium therewith. The instrument comprises a closed transparent tube, usually of glass, having external graduations. The bore of the tube is connected at one end with a reservoir of thermometric fluid, that is, fluid having a much greater coefficient of thermal expansion than that of the glass. The quantity of liquid is such that when the temperature of the reservoir or bulb varies within a predetermined range a meniscus of the liquid, usually mercury, moves within the tube and contiguous to the graduations. The bore of the tube is made of small size, compared to the reservoir, so that a small temperature responsive volume change in the mercury may cause a very perceptible movement of the meniscus in the tube. Herein this bore dimension will be referred to as capillary.

When the thermometer is removed from the body cavity into the lower ambient temperature, for reading, the mercury will immediately begin to move down with respect to the scale, so that the reading observed might be perceptibly lower than the maximum actually present. To prevent this, it is known to provide a restriction in the bore of the thermometer, reducing its size very considerably.

It will be appreciated that movement of the mercury out of the reservoir as the temperature rises is due to expansion of the mercury and is a very significant force: as a matter of fact thermometers are often provided with a second bulb at their other ends to receive mercury and prevent breakage of the thermometer by expanding mercury if inadvertenty exposed to high temperatures. On the other hand, when the temperature falls and the mass of mercury contracts, that portion of the mercury in the bore is impelled back into the reservoir principally by the cohesiveness of the mercury itself. The end of the tube remote from the reservoir is either evacuated or charged with an inert gas at low sub atmospheric pressure: in either case the force exerted on the mercury meniscus is not great, and the same is true as regards the surface tension forces at the meniscus. The restriction offers such resistance to the passage of mercury that the cohesiveness of the mercury is overcome and the column of mercury separates at the restriction, so that the maximum reading of the meniscus is retained. This leaves however, the problem of resetting the thermometer for reuse after its reading has been recorded or observed.

The traditional way of resetting a clinical thermometer is known as "shaking down" the thermometer, and is an acquired skillful motion of the arm and wrist which overcomes by centrifugal force the resistance of the restriction, and drives the mercury from the bore to the reservoir. Even among professional health workers this is an annoying necessity and occasionaly a difficult one: for private individuals where a home thermometer is only seldom used it becomes a major disadvantage of and deterent to free use of the instrument.

SUMMARY OF THE INVENTION

The present invention includes a thermometer and a holder therefor which together obviate the necessity of "shaking down" the instrument after each use. This is accomplished by substituting for the fixed bore restriction a valving arrangement including a plunger located in the mercury reservoir and having an end which seats against a surface of the thermometer, and a magnetically susceptible portion. In the normal condition of the plunger a restricted passage exists between the reservoir and the bore of the thermometer, which allows passage of mercury under temperature responsive expansion forces, but causes separation in the mercury column upon a decrease in temperature. Application of a magnet at the reservoir actuates the plunger away from its seat, enabling unrestricted passage of mercury by gravity from the bore to the reservoir. For convenience a thermometer holder having a magnet in its bottom is a part of the invention, so that simply restoring the thermometer to its holder automatically resets the thermometer for the next use.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

BRIEF DESCRIPTION OF THE DRAWING

In the drawing

FIG. 1 shows a first embodiment of my invention in a thermometer;

FIG. 2 is a central longitudinal section of the thermometer of FIG. 1 to a larger scale;

FIG. 3 is a transverse section along the line 3—3 of FIG. 2 to a larger scale;

FIG. 4 is a fragmentary view generally like FIG. 2 showing another embodiment of the invention;

FIG. 5 shows my thermometer in a resetting holder;

FIGS. 6 and 7 are fragmentary longitudinal sectional views of a third embodiment of the invention, the latter figure to a larger scale; and FIGS. 8 and 9 are fragmentary longitudinal and transverse sectional views of a still further embodiment of the invention.

DESCRIPTION OF THE PREFERRED EMBODIMENTS

Referring first to FIGS. 1 to 3, my invention includes a thermometer 20 comprising a glass tube or stem 21 closed at its ends 22 and 23 and having a bore 24 of such small size that mercury is prevented by its own capillarity from flowing therein under the action of gravity. Bore 24 communicates at end 23 with a bulb or reservoir 25 of mercury, which has a much greater temperature coefficient of expansion than that of glass, and at the other end 22 with an expansion chamber 26 which may be evacuated or charged with a small amount of gas such as nitrogen which is inert with respect to glass and mercury. The outer surface of tube 21 carries a scale 27 of graduations, in a range from 94° to 106° F. for humans, and the quantity of mercury is such that when the temperature ambient to the bulb or reservoir is for example 98° the mercury expands out of the reservoir into bore 24 and a meniscus appears at graduation "98°" on scale 27.

The volume of reservoir 25 is great compared with that of bore 24, so that only a small change in mercury temperature produces a considerable movement of the meniscus. Expansion chamber 26 has sufficient volume to prevent breakage of the thermometer in case it is inadvertently exposed to an ambient temperature greater than that on graduated scale 27. Similarly, the end of bore 24 near reservoir 25 is somewhat enlarged, at 28, so that even when exposed to low ambient temperatures the mercury does not contract so much as to withdraw entirely into reservoir 25.

As shown in FIG. 2, from which the showing of the mecury has been omitted, the connection between the graduated tube and the reservoir is formed internally as a surface of revolution about the axis of the tube 21, preferably as a conical transition 30 which functions as valving means in combination with a plunger 31. Plunger 31 may conveniently comprise a body 32 of magnetically susceptible material into which is pressfit a tubular member or needle 33 of stainless steel having a central bore 34 which extends axially the full length of the plunger. Body 32 has a collar 35 against which there bears one end of a compression spring 36: the other end of spring 36 bears against a plug 37 which closes end 22 of the thermometer. Bore 34 extends the full length of the plunger, and its end 40 adjacent surface 30 is formed as a convex surface of revolution about the axis of bore 21, preferably a hemisphere. Normally spring 36 holds surface 40 in sealing engagement with surface 30, but when a magnet suggested at 41 is brought into proximity with end 21 of the thermometer, body 32 is attracted thereto and surface 40 is disengaged from surface 30, as shown in FIG. 2, so that there is substantially free passage between bore 24 and reservoir 25. The walls of needle 33 are compressed together as at 43 near surface 40 to form a restriction in bore 34, as shown in FIG. 3.

A modification of the structure just described is shown in FIG. 4, in the position assumed in the absence of any magnet 41, and without an indication of the mercury itself. Parts appearing unchanged in FIGS. 2 and 4 have the same reference numerals. In this embodiment bore 44 does not pass axially through plunger 31, but is provided with a lateral tap 49 positioned to be under the mercury surface at all times.

My thermometer is most efficiently used in connection with a special holder 50, as is best shown in FIG. 5. Holder 50 comprises a vertical tubular body 51 closed at its lower end 52 and rendered stable by being secured in an enlarged base 53. Tube 51 is conveniently of plastic, and has a conical inner bottom 54. Molded or otherwise secured in bottom 54 is a strong pressed powdered iron disk magnet 55, the faces of which are the magnetic poles. A shorting disk 56 of soft iron is associated with magnet 55 to increase its effectiveness in known fashion. The distance between magnet 55 and the inside of the bottom of the tube is small.

The top 57 of tube 51 is open, and receives a removable cap 60 having a central aperture 61 through which thermometer 20 may be inserted. A guiding tube 62 extends inwardly from cap 60. Bottom 54 of tube 51 is configured to guide the bulb 25 of thermometer 20 into close proximity with magnet 55, when the thermometer is inserted through the cap, while protecting the magnet from any antiseptic liquid used in the tube to sterilize the thermometer after use.

It will be readily apparent that a similar magnet could equally well be installed in the conventional home thermometer case, for the same purpose.

The apparatus thus far described is used as follows. The thermometer 20 is initially ready in holder 50 at ambient or room temperature, which of course is lower than any graduation on scale 27. The meniscus of the mercury is somewhere in portion 28 of bore 24. Magnet 41 (members 55 and 56) is attracting body 32, overcoming the force of spring 36, and holding surfaces 30 and 40 out of sealing engagement.

For use the thermometer is raised from holder 50 for insertion into a body cavity of the patient. The immediate result of this removal is to disable the magnetic operation of the valve comprising surfaces 30 and 40, spring 36 now being able to move plunger 31 until the surfaces come into sealing engagement. The warmth of the patient's body causes reservoir 25 and the mercury therein to expand, the latter much more than the former, so that mercury is forced past restriction 43 and the meniscus moves with respect to scale 27, becoming stationary at a site determined by the patient's temperature after a known interval.

When the thermometer is removed for reading, the temperature ambient to reservoir 25 drops, and the mercury contracts, again more than the reservoir. However, while the expansion force of mercury was available during rise of temperature to force the viscous liquid passed restriction 43, the only significant force acting to cause the mercury in bore 24 to return to the reservoir is the cohesion of the liquid itself. As is well known, this force is not sufficient to overcome the resistance of the restriction, and the mercury column separates there leaving an unmoving thread of mercury in the bore with its meniscus at the graduation representative of the patient's temperature. It is to be recognized that whatever gas pressure is used in the upper end of the bore is not sufficient to overcome the restriction resistance: the thermometer retains its reading until properly recorded, after which the next step is to reset the thermometer to ambient temperature for reuse at a later time.

The resetting is accomplished simultaneously with sterilization of the thermometer, simply by inserting the thermometer into holder 50 so that plug 37 rests on the bottom of tube 51. This brings magnet 55 within operative range of plunger 31, which is accordingly drawn downward. Surface 40 is displaced away from surface 30, leaving a relatively large annular passage from bore 24 to reservoir 25 independent of the passage including bore 34 and restriction 43. This annular passage is large enough that gravity, aided possibly by very small gas pressure in chamber 26, can cause the return of mercury to reservoir 25, and this is automatically accomplished without any "shaking down" or other manipulation of the thermometer. Note that this operation takes place equally well whether the bore 34 extends entirely through body 32, or is provided with lateral tap 49.

FIGS. 6 and 7 show a modification of the invention in which plunger needle 133 is not hollow. Surface 130 is a concave surface of revolution, preferably conical, as before, and surface 140 is also generally a convex surface of revolution to seat sealingly against surface 130. The convex surface is however, broken at diametrically opposite sites by truncating planes oblique to the axis of the tube, so that the annular seal 130/140 is imperfect at these two sites, to provide restricted passage between reservoir 125 and bore portion 128. The total area of this passage is the same as that presented at restriction 43 of FIGS. 2 and 4, and functions in the same way to cause separation of the column of mercury so as to retain the reading as long as desired, after which magnetic actuation of the plunger 133 can enlarge the passage to reset the thermometer.

Another modification of the invention is shown in FIGS. 8 and 9, the latter being to a smaller scale. Here again, plunger 233 is not hollow. Surface 230 is concave and conical, but is of slightly elliptical cross section. Surface 240 is as before a convex surface of revolution, and in this embodiment is not modified. This construction gives a line of engagement between surfaces 240 and 230 which is incomplete and provides diametrically opposite restricted passages from reservoir 225 to bore portion 228. The eccentricity of the elliptical section is greatly exaggerated in FIG. 9 for clarity of illustration.

This embodiment of the invention is entirely analogous to that shown in FIGS. 6 and 7, and its operation is identical therewith. It will be obvious that if desired surface 230 may be of circular section, and surface 240 may be elliptical, to the same effect.

From the foregoing it will be evident that I have invented a new clinical thermometer system including a thermometer and a holder, in which insertion of the thermometer into the holder is sufficient to reset the thermometer to ambient temperature without any "shaking down", the thermometer having valving mechanism in the mercury reservoir for disabling a restriction normally acting to retain the position of the mercury until it can be read. Several preferred embodiments are known, all including a plunger which is magnetically actuated to disable a restriction and enable resetting to take place.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. In a clinical thermometer in which a thermometric liquid expands and contracts to give a meniscus which moves linearly in a stem with respect to fixed temperature graduations thereon:
    an elongated tube of transparent material characterized by a first temperature coefficient of expansion, and having a capillary bore connected at one end to a closed reservoir for liquid;
    temperature correlated graduations disposed in a scale along a first portion of said tube in contiguity to said bore;
    valve means including a member movable with respect to said tube between a normal position, in which limited passage is provided between said reservoir and said bore, and an actuated position in which substantially free passage is enabled between said reservoir and said bore;
    and a liquid in said reservoir having a greater coefficient of thermal expansion than said transparent material, the quantity of said liquid being such that as the ambient temperature rises within a predetermined range said liquid expands out of said reservoir into said bore in contiguity with said graduations, and said limited passage being so small as to prevent unaided movement of said liquid back into said reservoir, although permitting expansive movement of said liquid from said reservoir to said bore, so that as the ambient temperature falls, within said range, the body of liquid separates at the restricted passage said valve means being located in said reservoir and being magnetically actuable from without said reservoir.

2. A structure according to claim 1 in which said capillary bore is closed at both ends and the portion of said bore remote from said reservoir is charged with an inert gas at low subatmospheric pressure.

3. In a clinical thermometer comprising a closed elongated tube of transparent material characterized by a first coefficient of thermal expansion and having temperature-correlated graduations disposed in a scale along a principal portion thereof, said tube having a capillary bore in contiguity with said graduations and communicating with a reservoir of liquid characterized by a greater coefficient of thermal expansion than said material, so that when said liquid is heated said liquid moves outward in said bore from said reservoir, said bore having a restriction near said reservoir, so that when said liquid is cooled the column of liquid in said bore separates at said restriction.
    the improvement wherein said restriction comprises valve means including a member movable in said tube between a normal position, in which it provides limited passage between said reservoir and said bore, and an actuated position in which it enables substantially full passage between said reservoir and said bore said valve means being located in said reservoir and being magnetically actuable.

4. In a thermometer:
    a reservoir for thermometric liquid;
    a graduated bore connected to said reservoir by a tapering transition;
    valve means in said reservoir including a plunger and means resiliently urging said plunger into internal engagement with said tapering transition,
    the configuration of said transition and said plunger being such that said engagement results in a restricted pathway between said reservoir and said bore of predetermined size large enough to permit flow of said liquid from said reservoir to said bore upon rise in ambient temperature, but small enough to prevent return flow of said liquid from said bore to said reservoir upon fall in ambient temperature,
    at least a portion of said plunger remote from said transition being of magnetic material so that said plunger may be magnetically actuated, from without said reservoir, out of said engagement with said transition to enable unrestricted passage between said bore and said reservoir.

5. A structure according to claim 4 in which said plunger includes a passage communicating with said reservoir and opening at all times into said transition, said passage having a restriction of said predetermined size.

6. A structure according to claim 4 in which said plunger is solid and terminates in a convex surface of revolution apposed to said transition, and said transition is a concave surface of revolution, so that the surfaces engage at a circle of contact, at least one of said surfaces being modified so that said circle is not complete, leaving a restricted passage between said surfaces.

7. A structure according to claim 6 in which said convex surface is truncated by at least one plane oblique to the axis of revolution.

8. A structure according to claim 6 in which one of said convex and concave surfaces is not a surface of revolution, so that the line of contact therebetween is discontinuous to leave a passage of liquid therebetween.

9. In combination:
a clinical thermometer magnetically resetable externally to the ambient temperature;
and a holder for said thermometer including a magnetic member positioned to cause resetting of said thermometer when the latter is inserted vertically therein.

10. Apparatus according to claim 9 in which said thermometer includes a plunger resiliently mounted in the reservoir thereof having a magnetically susceptible component, and the holder includes a magnetic member near its bottom to actuate said plunger.

* * * * *